United States Patent Office 3,509,763
Patented May 5, 1970

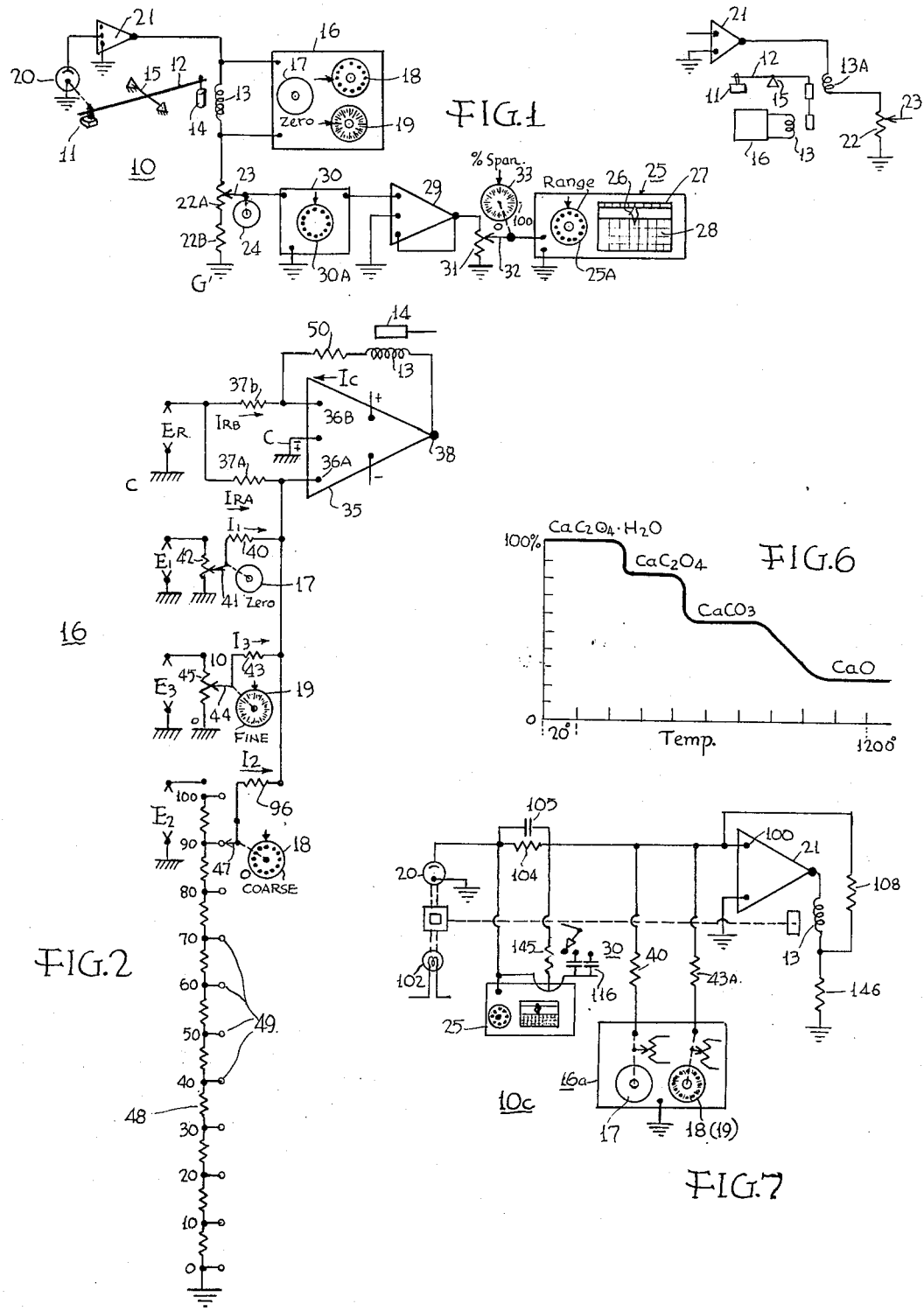

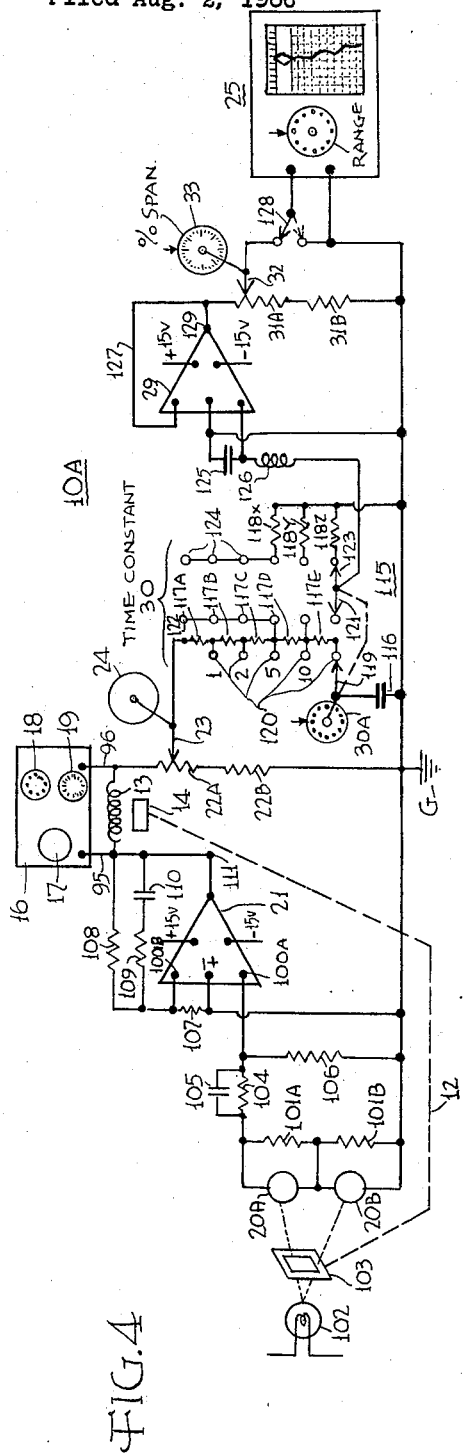

3,509,763
FORCE BALANCES OF THE ELECTRO-
MAGNETIC TYPE
Raymond W. Tabeling, Wilmington, Del., and John D.
McGhee, Plymouth Meeting, Pa., assignors to E. I. du
Pont de Nemours and Company, Wilmington, Del., a
corporation of Delaware
Filed Aug. 2, 1966, Ser. No. 569,643
Int. Cl. G01l 1/08
U.S. Cl. 73—141
7 Claims

ABSTRACT OF THE DISCLOSURE

A force balance preferably comprising an electromagnetic coil; an element which is displaced from a reference position during the existence of an unbalance between an unknown force and an opposing force produced by the electromagnetic coil; an amplifier having input and output circuits, the output circuit including the electromagnetic coil; a calibrating current source connected to the electromagnetic coil for producing currents for suppressing to a known extent nearly all of the total unbalance of the forces; a sensor, such as, a photoelectric cell, responsive to the displacement of the aforementioned element connected to the input circuit of the amplifier and adapted to produce an error signal proportional to the remaining unbalance of the forces; and a calibrated device for readout of the remaining unbalance.

---

This invention relates to force balances, such as used for example in recording analytical microbalances and thermogravimetric analyzers, and particularly relates to force balances of the electromagnetic type.

In prior electromagnetic balances, a detector comprising a sensor-amplifier arrangement supplies to the rebalance coil the current required to restore the balance beam, or equivalent element, to a null or reference position. In such balances, the current supplied by the sensor-amplifier to the coil and to the readout resistor of the associated measuring circuitry corresponds to the total unbalancing force.

In accordance with preferred forms of the present invention, there is provided a calibrated current source which, independently of the detector, provides for supply to a coil of the balance preselected current values which in any given case suppress nearly all of the unknown forces. The detector supplies to the same, or a different, coil of the balance only an error signal proportional to the small unbalancing force existing either at the beginning of a measurement or subsequently occurring during test as a function of temperature, time or other test parameter.

With electromagnetic balances embodying such feature of the present invention, the response range of the detector need be linear only for a narrow range corresponding with the maximum value of the unsuppressed remnant or increment of the unknown balancing force rather than the range. wider by several orders of magnitude, corresponding with the maximum value of the total unbalancing force. Moreover, with electromagnetic balances of the present invention, the amplifier utilizes only a small fraction of its full dynamic range in opposing the unsuppressed remnant or increment of the unbalancing forces so that practically its full output capabilities are always available for dynamic cancellation of spurious upsets in the system. This is in contrast to prior systems in which the maximum capacity of the balance is limited by the output capability of the amplifier with the result that when the balance system is being operated near its upper limit, the amplifier becomes saturated upon occurrence of an upset and, therefore, ineffective for dynamic restoration of operation.

More specifically, and further in accordance with the present invention, there is provided a stabilized current source having calibrated means adjustable to deliver current values corresponding with known magnitudes of the unbalancing force, so leaving only the unsuppressed residual or increment for determination. Such determination may be precisely made by measurement of the error signal to the exclusion of the suppression current supplied by the stabilized source. Specifically, the stabilized current source comprises a differential amplifier, one of whose input terminals serves as a summing junction to which is delivered, through summing resistance means, a fixed standard current and one or more other currents respectively corresponding with the setting of a calibrated coarse-step potential-divider, the continuously adjustable setting of a calibrated vernier slidewire, and the setting of a zeroing slidewire; the other terminal of the differential-amplifier serves as a summing junction to which is delivered, through summing resistors, a fixed standard current and the load or coil current of the amplifier.

In accordance with all forms of the present invention, the calibrated electroresponsive means for measuring the unsuppressed increment or remnant of the total unbalancing force comprises resistance means traversed only by the error signal and to the exclusion of any suppression signal corresponding with current supplied by said calibrated current source.

For a more detailed understanding of the invention, reference is made to the following description of various embodiments thereof and to the accompanying drawings in which:

FIG. 1 is a block diagram of a force balance incorporating one form of the invention;

FIG. 1A is a modification of part of FIG. 1;

Figure 3:
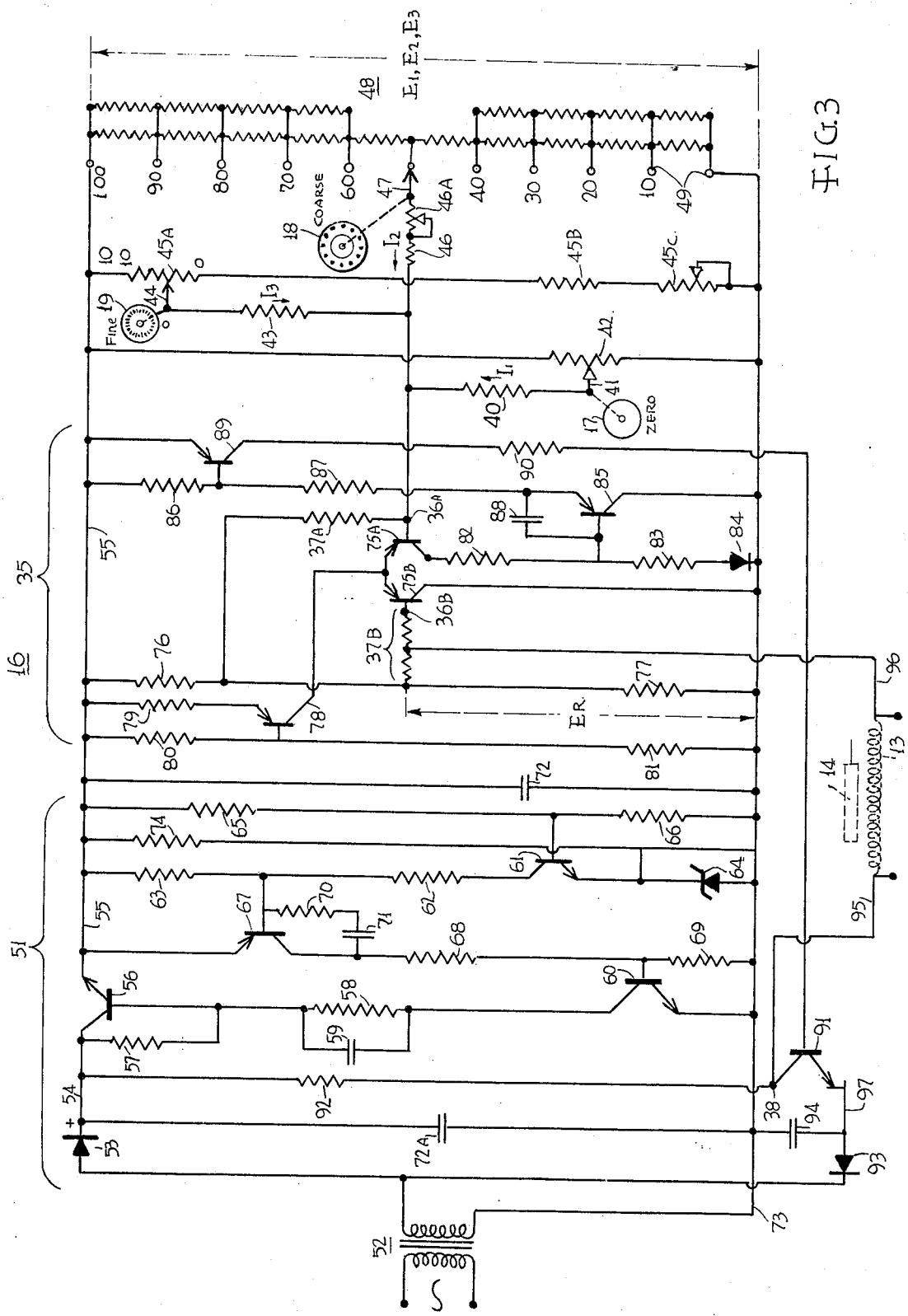

FIG. 2 schematically illustrates the basic force suppression circuitry of FIG. 1, FIG. 1A and subsequent figures;

FIG. 3 is a circuit diagram showing a preferred form of the summing amplifier of FIG. 2, its regulated power supply and the calibrated output-determining resistors;

FIGS. 4 and 5 schematically illustrate two modifications of circuitry for detecting and measuring the unsuppressed force of the balance shown in FIG. 1;

FIG. 6 is referred to in discussion of one of the uses of the force balance; and FIG. 7 is a block diagram of another force balance incorporating features of the present invention.

Referring to FIG. 1, the balance 10, though preferably of the horizontal beam type disclosed and claimed in U.S. Pat. 3,373,598, may be of any type having an element such as beam 12 displaced from a reference position in response to unbalance forces. In the particular balance shown, the tray 11 for receiving specimens to be weighed, is supported from beam 12 on one side of the axis of rotation 15. The coil 13 for applying a counter-force, or torque, is associated with an armature 14 supported by beam 12 on the opposite side of axis 15. Current for coil 13 is supplied from a stable or regulated supply source 16. With the tray 11 empty, the current supplied to coil 13 from source 16 is preset, or is adjusted by dial 17, to be of value for which beam 12, or equivalent has zero displacement from a reference position. Since this value of current is not of significance in determination of weight, or changes in weight, of the specimen, the zeroing dial 17 need not be calibrated.

The dials 18, 19 of the regulated current source, however, are calibrated so that additional current supplied to coil 13 from source 16 is precisely known. For example, the dial 19 may have ten positions, in addition to its zero position, to supply ten different current values respectively precisely corresponding with ten equal increments of specimen weight, and dial 18 may have a continuous scale whose total range corresponds with one step of dial 19. As later explained, these calibrated dials, or equivalent, are set so that coil 13 provides a known value of counter force which suppresses the major part of the unknown weight of the specimen.

The arrangement for detecting the small residual unbalancing forces includes the sensor 20 for producing an error signal corresponding with displacement of beam 12 from its reference or balance position. The error signal may be measured in terms of force or weight by any suitably calibrated metering device.

In the system shown in FIG. 1, the error current is passed through resistors 22A, 22B to produce a voltage drop which is applied to a recorder 25. For high accuracy and linear relationship between the error current and the unsuppressed residual of the unbalancing force, the error current is also utilized to apply a counter-force to beam 12. As shown in FIG. 1, the error signal, as enhanced by high-gain amplifier 21, may be supplied to the same coil 13 used for suppressing the major part of the total unbalancing force, or the error signal may be supplied to a separate coil 13A (FIG. 1A) not in circuit with coil 13. In either case, the beam 12 is never completely restored to the reference position for the reason that the continued existence of an error signal is required to produce the additional counter force or torque corresponding with the unsuppressed residual of the unbalancing force. For any given value of the unsuppressed residual, the displacement of the beam from the zero position produces an error signal proportional thereto. It is to be noted that the response characteristic of the detector system, whether including only a sensor 20 or a sensor 20 plus amplifier 21, need be linear only over a narrow range corresponding with that of the small unsuppressed part of the total unbalancing force rather than the total unbalancing force. Assuming for example the range of the balance is up to 100 milligrams, the detector system need be linear over a range of only 0 to 1 milligram. It is to noted also that since nearly all of the total unbalancing force is suppressed by current from source 16, most of the dynamic range of the detector 21 is always available to compensate for upsets in the system as occasioned, for example, by shock or vibration.

To complete the description of the balance system 10 of FIG. 1 as shown, the amplifier 29 is used when necessary to effect an impedance match between the recorder-indicator 25 and the time constant circuit 30. The recorder-indicator 25 may be a multirange instrument: specifically, the milligram settings of its range dial 25A may respectively correspond to 100, 50, 20, 10, 5, 2 and 1 for full-scale reading of the marker 26 associated with scale 27 and chart 28. The block 30 represents a filter network whose time constant may be varied by adjustment of dial 30A. The dial 24 is provided for adjustment of contact 23 of the readout resistor to compensate for deviations from standard of the distance of the tray from the pivotal axis of the beam. The potential-divider 31 having dial 33 for its adjustable contact 32 is provided for reading of the indicator scale 27 or chart 28 in terms of precision of the unsuppressed force rather than in weight units.

The procedure for precisely weighing of specimens is now described. Controls 18 and 19, the coarse and fine weight suppressions, are set to their zero positions. Any residual weight is then tared to a zero reading on the recorder using zero control 17. The object to be measured can then be placed into sample tray 11 and its weight recorded by suitably adjusting the recorder range switch 25A. Its weight can then be read directly off the recorder chart 28. If it is desired to read the weight more precisely than one is able to read the chart of the recorder 25, then most of the weight should be suppressed by adjustment of knobs 18 and 19. The recorder range switch 25A can then be set to a more sensitive position and only the small residual weight difference between the suppression settings 18 and 19 is then read on recorder 25. This residual is then added to the readings of 18 and 19 to determine the total weight.

When it is desired to determine the percent of weight change of a specimen, the instrument is first "zeroed" by knob 17 with no weight in tray 11. The sample is then added to tray 11 and the weight is noted on the recorder 25 after suitably positioning the range switch. The range switch is then set to its next more sensitive position so that the recorder now reads more than full scale. The recorder is then adjusted to 100% of full scale using the percent of span control 33. Referring to FIG. 6, it can be seen that a given sample of calcium oxalate, for example, was set to 100% full scale reading at room temperature. As the temperature of the sample was raised, water was first liberated and then a molecule of carbon dioxide. The percentage of weight change can then be directly read off the Y-axis of the chart as a percent.

The preferred basic circuitry for the calibrated source 16 comprises a differential amplifier (FIG. 2) whose input terminals 36A, 36B each serves as a current-summing junction. A fixed reference current $I_{RA}$ is supplied to input terminal 36A from a source of constant voltage $E_R$ via the summing resistor 37A: the "zeroing" current $I_1$ supplied to input terminal 36A via the summing resistor 40 is smoothly adjustable by dial 17 of a potentiometer slidewire 42 which is connected across a source of constant voltage $E_1$: the current $I_2$ supplied to input terminal 36A via summing resistor 46 is adjustable in equal steps by calibrated dial 18 of resistor 48 which is connected across a source of constant voltage $E_2$: the current $I_3$ supplied to input terminal 36A via the summing resistor 43 is finally adjustable by calibrated dial 19 of potentiometer slidewire 45 which is connected across a source of constant voltage $E_3$. A fixed reference current $I_{RB}$ is supplied to the other input terminal 36B of differential-amplifier 35 from the source of constant voltage $E_R$ via the summing resistor 37B. The force-suppression coil 13 of the balance is included in a feedback loop between the output terminal 38 of the amplifier and its input terminal 36B. The resistor 50 in this feedback loop represents the effective series-resistance of coil 13 plus any additional summing resistance that may be required. By feedback action of the high-gain differential-amplifier 35, the coil current $I_C$ of the balance is maintained constant at the value predetermined by the selected settings of the dials 17, 18 and 19. In other words, assuming for simplicity that the reference currents $I_{RA}$ and $I_{RB}$ are equal, the output current of the amplifier as supplied to coil 13 is maintained equal to the sum of the adjustable currents $I_1$, $I_2$ and $I_3$ supplied to input terminal 36A of the amplifier.

As shown in FIG. 3, all of the aforesaid voltages $E_R$, $E_1$, $E_2$, $E_3$, as well as the operating voltage of amplifier 35, may be and preferably are derived from a single regulated source. The power transformer 52 of source 51 is supplied from an AC line as a common 60-cycle, 110-volt line. The AC output of the secondary winding of transformer 52 is rectified by diode 53 and smoothed by filter capacitor 72A to provide an unregulated DC voltage between positive conductor 54 and the negative conductor 73. The series-regulator of the source 51 is a transistor 56 which may be of the 2N1700 type having its collector connected to the cathode of diode 53 and its emitter connected to the positive conductor 55. The base of transistor 56 is connected to its collector by resistor 57 and is also connected to the negative conductor 73 through an RC network 58–59 and the collector of transistor 60. As later appears, transistor 60 is the third stage of a regulator-amplifier. The first stage of the regulator-amplifier comprises a transistor 61 whose base is connected to an intermediate point of the potential-divider formed by resistor 65–66, and is connected in series across the output conductors 55, 73 of source 51. The collector of transistor 61, which may be of the 2N3707 type, is connected to the positive conductor 55 via load resistor 62 and the turnoff resistor 63. The emitter of transistor 61 is connected to the positive conductor 55 by resistor 74 and to the negative conductor 77 by the Zener diode 64 which serves as a voltage standard.

Any deviation from the desired constant output voltage of source 51 as appearing between conductors 55, 73 is amplified by transistor 61 and applied to the base of transistor 67 which serves as the second stage of the regulator-amplifier. The emitter of transistor 67, which may be of the 2N3638 type, is connected to the positive conductor 55 and its collector is connected to the negative conductor 73 via resistor 68, 69 whose common terminal is connected to the base of the previously mentioned third stage transistor 60. The collector of transistor 67 is also connected to its own base through the time constant network comprising resistor 70 and capacitor 71 in series.

The effective series-resistance of transistor 56 is thus rigidly controlled by the three-stage amplifier to compensate for otherwise occurring changes of the output voltage of source 51, changes of DC load, or with variations of AC line voltage. The capacitor 72 is the smoothing or filter capacitor for the regulated output voltage of source 51.

The differential-amplifier 35, whose operating voltages and currents are provided by source 51, comprises a pair of input transistors 75A, 75B which may be of the 2N3638 type. The collector-emitter current for both transistors 75A, 75B is provided through the collector-emitter circuit of transistor 78. The base of transistor 78 is connected to the intermediate tap of a voltage-divider formed by resistors 80, 81 connected in series across the regulated DC output conductors 55, 73. The emitter of transistor 78, which may be of the 2N3638 type, is connected to the positive conductor 55 through dropping resistor 79, and the collector of resistor 78 is connected to the emitters of both input transistors 75A, 75B of differential-amplifier 35. The junction of voltage-divider resistors 76, 77 provides a reference voltage $E_R$ (FIGS. 2, 3). The base of transistor 5B is supplied with fixed reference current from voltage source $E_R$ through summing resistor 37B. The base of transistor 75A is supplied with its fixed reference current from the same voltage source through summing resistor 37A. The base of transistor 75A is also connected through summing resistor 40 to the relatively adjustable contact 41 of the "zeroing" slidewire 42 which is connected across regulated output conductors 55, 73 through summing resistor 43 to the relatively adjustable contact 44 of slidewire 45 which is connected in series with fixed resistor 45B and rheostat 45C across regulated output conductors 55, 73; and through summing resistor means 46, 46A to movable contact 47 of the stepped resistance means 48 also connected across the regulated output conductors 55, 73.

Thus, at any given time, the total current supplied to the summing junction or input terminal 36A for the A channel of amplifier 35 is, as in FIG. 2, the sum of fixed reference current $I_{RA}$ and one or more of the selected values of currents $I_1$, $I_2$, $I_3$ as determined by the settings of dials 17, 18, 19. The A channel of amplifier 35 includes three additional amplifier stages respectively including transistors 85, 89, 91. The base of the second stage transistor 85 is connected to the junction of resistors 82 and 83. These resistors are connected in series with the temperature-compensating diode 84 between the collector of input transistor 75A and the negative output conductor 73. The collector of transistor 85, which may be of the 2N3707 type, is also connected to conductor 73. The emitter of transistor 85 is connected to the plus conductor 55 through resistors 86, 87 and is capacitively connected to its own base by capacitor 88.

The base of the third stage transistor 89 is connected to the junction of aforesaid resistors 86, 87 in the emitter circuit of transistor 85 and the emitter of transistor 89, which may be of the 2N3638 type, is connected to the positive supply conductor 55. The collector of transistor 89 is connected via resistor 90 to the base of transistor 91 included in the final or driver stage of channel A of amplifier 35.

To provide the positive and negative requirements for the driver stage, there is used a negative voltage circuit including the additional diode 93 and capacitor 94. The cathode of diode 93 is connected to the same secondary terminal of transformer 52 as is the anode of diode 53. The capacitor 94 is connected between the anode of diode 93 and negative conductor 73. In consequence, the voltage difference appearing between conductors 54 and 97, is twice the voltage-difference existing between conductors 54 and 73.

The collector of output transistor 91 is connected to the positive supply conductor 54 through resistor 92 and the emitter of transistor 91 is connected to the more negative supply conductor 97. The collector of transistor 91 serves as output terminal 38 of amplifier 35 and is connected by conductor 95 to one side of the load—specifically, the torque-suppression coil 13 of the force balance. The other side of the load coil 13 is connected by conductor 96 through part of resistor 37B to the summing junction 36B in the input circuit of the B-channel of differential-amplifier 35.

Reverting to the calibrated resistance means of the force-suppression circuitry of FIG. 3, the resistance means between the successive fixed contacts 49 for the stepped resistance 48 are of values respectively corresponding with known, equal increments of force or weight suppressed by coil 13 and the "coarse" dial 18, or associated scale, is so marked. The summing resistance means 46, 46A traversed by current $I_2$ from adjustable contact 47 of stepped resistance has an adjustable section 46a set by the manufacturer or serviceman. The total resistance value of the slidewire 45A, whose contact 44 is adjustable by the "fine" dial 19, corresponds with one increment of the "coarse" dial 18. The adjustable section 45C of the total series-resistance 45A, 45B, 45C across regulated output conductors 55, 73 is set by the manufacturer or serviceman. The dial 19, or its scale, is also calibrated to read in terms of force or weight suppressed by coil 13. Although slower to use, a single calibrated multi-revolution slidewire, itself providing the total range of the balance, may replace the stepped resistor 48 and slidewire 45A.

Suitable values for components of the circuitry shown in FIG. 3 are tabulated below.

TABLE A

Resistors:
    37A—82.5 K. ohm
    37B—47 K. ohm
    40—1 megohm
    42—10 K. ohm
    43—499 K. ohm
    45—5 K. pot: 4020 ohms: 2 K. rheo
    46—90.9 K: 20 K. rheo
    48—(10) 100 ohms (with shunts for linearity)
    57—100 K.
    58—1 K.
    65—510 ohms
    66—750 ohms
    68—10 K.
    69—10 K.
    70—20 K.
    74—1.6 K.
    76—402 ohms
    77—402 ohms
    79—62 K.
    80—10 K.
    81—51 K.
    82—51 K.
    83—51 K.
    90—10 K.
    92—2 K.

Capacitors:
    59—.004 µf.

TABLE A.—Continued

Capacitors:
    71—150 μf.
    72—2.2 μf.
    72A—250 μf.
    88—.047 μf.
    94—250 μf.

Transformer:
    52—110 v: 18 v.

In the force balance 10A shown in FIG. 4, the major part of the current supplied to the torque-suppression coil 13 is provided by a calibrated current source 16 whose circuitry is preferably that of FIG. 3 above described. The detectors for supplying the small additional current corresponding with the unsuppressed unknown weight of the specimen includes the photocells 20A, 20B, or like sensitive means, capable of producing an error signal without imposing a load on the balance beam 12. The light target or mask 103, movable with beam 12, is in the path of light from lamp 102 to the photocells. The DC error signal supplied by the photocell means to one channel of differential amplifier 21 is, therefore, a function of the displacement of balance beam 12 or equivalent from its reference or "zero" position.

The photocells 20A, 20B are in series in the A input channel of amplifier 21 and are respectively shunted by resistors 101A, 101B of suitable magnitude, for example, 10 kilohms. The photocell sensors 20A, 20B, are connected to input terminal 100A of amplifier 21 through the network comprising resistor 104 and shunt capacitor 105 respectively having, for example, the values of 47 kilohms and one microfarad. The input resistor 106 connected between terminal 100A and the ground or circuit-common G may also have a value of 47 kilohms. The output terminal 111 of amplifier 21 is connected to one terminal of the suppression coil 13 of the balance and is also connected to the B channel input terminal 100B through two feedback paths. The DC feedback path is provided by resistor 107 having, for example, a value of 1.5 megohms, and the AC feedback path is provided by resistor 109 and series-capacitor 110 respectively having, for example, the values of 27 kilohms and 8 microfarads. The B channel input resistor 107 is connected between input terminal 100B and the circuit-common G. The amplified error signal current, to the exclusion of current supplied by source 16 to coil 13, traverses the measuring resistance means 22A, 22B. The voltage drop between circuit-common G and the adjustable contact 23 of slidewire 22A is measured by the calibrated metering means 25 which, as shown, may be a recorder/indicator.

The adjustable time constant network 30 interposed in circuit between the measuring resistance means 22A, 22B and the recorder includes a group of resistors for connection in various series and/or shunt relations to capacitor 116 and inductance 126 under control of a switch 115 having ganged contacts 119, 121, 123 coupled to dial 30A. The resistors 117A–117E are connected in series from the tap or contact 23 of the measuring resistance means. This string or set of series-resistors has indicated connections to fixed contacts 120 engageable by movable contact 119 and with indicated connections to contacts 122 engageable by movable contact 121. The shunt resistors 118X, 118Y, 118Z have indicated connections to contacts 124 engageable by movable contact 123 of the gang switch 115. In the particular time constant network shown, the six positions of switch 115 respectively correspond to OFF, 1, 2, 5, 10 and 20 seconds.

The impedance matching amplifier 29 interposed between network 30 and recorder 25 is of the differential type, with one of its input terminals connected to inductance 126 of the network 30 and to the ungrounded terminal of capacitor 125. The other input terminal of amplifier 29 is connected to its output terminal 129 by a feedback loop comprising conductor 127. The output circuit of amplifier 29 includes slidewire 31A and resistor 31B which provide a span-adjustment for the recorder 29 or other metering means. The adjustable contact 32 of slidewire 31A is coupled to the calibrated "percent span" dial 33 and is connected through switch 128 to the ungrounded input terminal of recorder 25. With switch 128 thrown to the dotted-line position, the recorder is excluded from the circuit. This is used to find the true zero of the recorder for reference in setting up samples and checking the calibration. Except for differences discussed below, the balance system 10B of FIG. 5 is similar to that of FIG. 4 and corresponding elements are identified by the same reference characters. The balance system includes an AC damping amplifier 130 comprising in its two stages the transistors 131, 132 which may respectively be of the 2N3707 and 2N3637 types. The input transistor 131 is connected to the displacement sensor means 20A, 20B solely by way of capacitor 135 so that the amplifier 130 responds only to the change in position of balance beam 12.

The DC voltage on the base of transistor 131 remains fixed at the values determined by the voltage-divider resistors 133, 134. The collector and emitter electrodes of input resistor 131 are respectively connected via resistors 136, 137 to the opposite terminals of a DC supply source (not shown). The collector of transistor 131 is connected, solely by capacitor 138, to the base of transistor 132 in the second stage of amplifier 130. The collector of transistor 132 is connected by resistor 141 to its base electrode and is connected by resistor 140 to the negative or grounded terminal of the DC supply source.

The emitter of transistor 132 is connected by resistor 139 to the other terminal of the DC supply source. The output of amplifier 130 is applied, solely by capacitor 142, to the force-suppression coil 13 of the balance. The isolation resistor 143 effectively precludes interconnection between the AC damping amplifier 130 and the DC amplifier 21. The shunt capacitor 105 of FIG. 4 is omitted, in FIG. 5, from the input circuitry of DC amplifier 21 and the resistor 108 (FIG. 4) may be omitted from the feedback circuitry of that amplifier.

The addition of a separate AC amplifier around the DC amplifier permits the adjustment of the AC and DC gains on an individual basis, thus permitting wide differences in the AC and DC gain characteristics. This is highly desirable depending upon the application and size of the balance involved. The gains can then be independently adjusted for varying conditions of external transients and/or differences in inertia in different-sized balances.

In the force balance system 10C shown in FIG. 7, the precision current supply source 16A is in the input circuit of amplifier 21 here used as a summing amplifier for the error signal output of the displacement sensor 20 and the torque-suppression signal from source 16A. In the circuit shown, the resistor 104 serves both as the summing resistor for the error signal output of photocell sensor 20 and as the readout resistor for recorder 25 or equivalent metering means. The isolation resistor 145 of suitably high value effectively eliminates any shunting effect of the recorder upon summing resistor 104. Isolation resistor 145 may also be used as time constant network 30 for recorder 25 by providing for addition of one or more shunt capacitors 116. In FIG. 7, the summing resistor 40 in the "zero-adjust" circuit and the summing resistor 43A in the calibrated "fine and/or coarse adjust" circuitry connect the calibrated supply source 16A to a summing point in the input circuit of amplifier 21. In FIG. 7, unlike preceding figures, amplifier 21 supplies all of the current for the balance coil 13. It is to be noted, however, that the readout resistor 104, like the readout resistor 22 of preceding modifications, is traversed only by current corresponding with the beam displacement, not with current corresponding to the total unbalancing force. It is also to be noted that in FIGS. 4 and 5, the resistor 104 in the input circuit of amplifier 21 may be used as the readout resistor instead of resistors 22A, 22B in the output circuit of that amplifier.

In FIG. 7, the resistor 146 connected between the coil 13 and the circuit-common G or ground provides the desired amount of feedback current through resistor 108 back to the summing point or input terminal 100 of the amplifier. This arrangement permits a wide range of choice coil current and input currents.

It shall be understood that the present invention is not limited to the specific arrangements described and illustrated herein.

What is claimed is:

1. A force balance, for measuring the weight of a sample, comprising:
   (a) an element adapted to be displaced from a reference positioned by an unknown force;
   (b) electromagnetic coil means having at least one coil, and adapted to produce a force on said element opposing the unknown force;
   (c) amplifier means having input and output circuits, the output circuit of said amplifier including a coil of said electromagnetic coil means;
   (d) sensor means responsive to the displacement of said element and connected to the input circuit of said amplifier, said sensor means being adapted to produce an error signal proportional to the displacement of said element, said error signal being amplified by said amplifier and supplied to the coil of said electromagnetic coil means in the output circuit of said amplifier to produce a force balancing the displacement of said element sensed by said sensor means;
   (e) an adjustable calibrated current source connected to a coil of said electromagnetic coil means in a manner such as to produce a force suppressing to a known extent nearly all the total unknown force due to the weight of said sample, whereby the displacement sensed by said sensor means is due to only the remaining unknown force, thereby reducing the signal supplied to said amplifier by said sensor means to a level below the saturation level of said amplifier, regardless of the weight of said sample; and
   (f) calibrated electroresponsive means for readout of the remaining unknown force, including readout resistance means disposed in one of said amplifier circuits and traversed by the signal from said sensor means to the exclusion of the current from said calibrated current source, whereby the total weight of said sample can be determined by combining the error signal generated by said sensor means and read out by said electrorespective means with the signal generated by said calibrated current source.

2. A force balance as in claim 1 in which said electromagnetic coil means includes two coils, one of which is said coil in the output circuit of the amplifier and the other of which is connected to said calibrated current source.

3. A force balance of the type having electromagnetic coil means, said force balance comprising:
   an element displaced from a reference position during existence of unbalance between an unknown force and an opposing force produced by said electromagnetic coil means,
   amplifier means having input and output circuits and whose output circuit includes a coil of said electromagnetic coil means,
   a calibrated current source having adjustable means and connected to provide said coil in the output circuit of said amplifier means, in addition to the signal from the amplifier, directly with current for suppression, independently of the amplifier, of nearly all of the total unbalance of said forces,
   sensor means responsive to displacement of said element and connected to the input circuit of said amplifier to produce an error signal proportional to the remaining unbalance of said forces, and
   calibrated electroresponsive means for readout of said remaining unbalance including readout resistance means in one of said amplifier circuits and traversed by the error signal to the exclusion of current from said calibrated source.

4. A force balance as in claim 3 in which the amplifier means consists of a DC differential-amplifier having said sensor means and an RC network connected in series to one of its input terminals and having its other input terminal connected through a feedback network to its output terminal.

5. A force balance as in claim 3 in which the amplifier means comprises
   a DC differential-amplifier having said sensor means connected to one of its input terminals and having its other input terminal connected through a feedback network to its output terminal, and
   an AC amplifier having its input terminal connected solely by capacitive means to said sensor means and having its output terminal connected solely by capacitive means to said coil in the output circuit of said DC amplifier.

6. A force balance as in claim 3 in which the amplifier means comprises a DC differential amplifier having said sensor means connected to one of its input terminals and having its other input terminal connected through a feedback network to its output terminal.

7. A force balance of the type having electromagnetic coil means, said force balance comprising:
   an element displaced from a reference position during existence of unbalance between an unknown force and an opposing force produced by said electromagnetic coil means;
   amplifier means having input and output circuits and whose output circuit includes a coil of said electromagnetic coil means;
   a calibrated current source having adjustable means connected to provide said coil means with current values suppressing to known extent nearly all of the total unbalances of said forces, said calibrated current source comprising
      a differential-amplifier including said coil in a feedback circuit from its output terminal to one of its input terminals,
      means for supplying fixed reference values of current to both input terminals of said differential-amplifier through current-summing resistance means, and
      means for supplying to the other input terminal of said differential-amplifier through said current-summing resistance means selected values of current corresponding with the settings of said adjustable calibrated current source;
   sensor means responsive to displacement of said element and connected to the input circuit of said amplifier to produce an error signal proportional to the remaining unbalance of said forces; and
   calibrated electroresponsive means for readout of said remaining unbalance including readout resistance means in one of said amplifier circuits and traversed by the error signal to the exclusion of current from said calibrated source.

References Cited

UNITED STATES PATENTS

| | | | |
|---|---|---|---|
| 2,407,513 | 9/1946 | Pounds | 177—210 XR |
| 2,675,222 | 4/1954 | Clark | 73—382 XR |
| 3,106,978 | 10/1963 | Cahn | 177—210 |
| 3,224,517 | 12/1965 | Cahn | 177—210 |
| 3,293,911 | 12/1966 | Ziegler | 73—141 |

CHARLES A. RUEHL, Primary Examiner

U.S. Cl. X.R.

177—210